United States Patent

[11] 3,537,405

| [72] | Inventor | Albert F. Verhoeven |
| | | Grand Rapids, Michigan |
| [21] | Appl. No. | 713,695 |
| [22] | Filed | March 18, 1968 |
| [45] | Patented | Nov. 3, 1970 |
| [73] | Assignee | Werner Lehara Inc. |
| | | Grand Rapid, Michigan |
| | | a corporation of Michigan |

[54] BAKING IN ROTATABLE RACK OVENS
17 Claims, 12 Drawing Figs.

[52] U.S. Cl. .................................................. 107/54, 107/60
[51] Int. Cl. ....................................................... A21c 1/44
[50] Field of Search ........................................... 107/54(all), 55(all), 56, 60

[56] References Cited
UNITED STATES PATENTS

| 3,402,683 | 9/1968 | Tillander et al. | 107/55 |
| 3,412,695 | 11/1968 | Andersson | 107/55 |
| 1,018,178 | 2/1912 | Faulds | 107/62 |
| 1,771,885 | 7/1930 | Faulds | 107/60 |
| 1,786,142 | 12/1930 | Wyman | 107/60 |
| 1,895,230 | 1/1933 | Needham | 107/60 |

Primary Examiner—Fred C. Mattern, Jr.
Assistant Examiner—Robert I. Smith
Attorney—Price, Heneveld, Huizenga and Cooper ABSTRACT: This disclosure relates to baking in a rotatable rack oven in which a rack with goods to be baked is rolled into the oven, the rack is lifted off the floor and rotated while baking with heated air supplied from one side of the oven. A moving air column is provided beneath the floor of the oven to protect the floor beneath the oven. Means are provided to lower the rack in a predetermined position relative to the door when the oven is turned off.

Patented Nov. 3, 1970
3,537,405
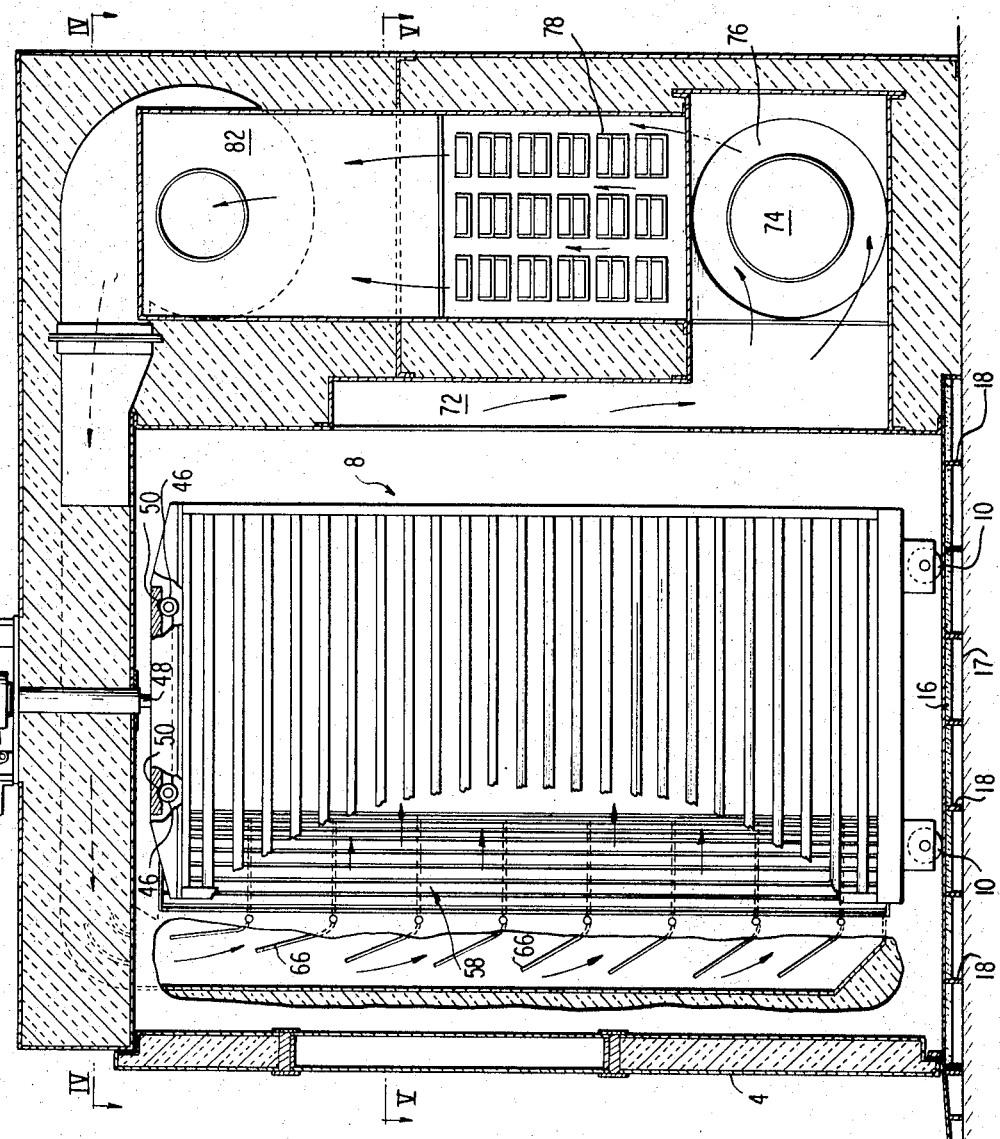
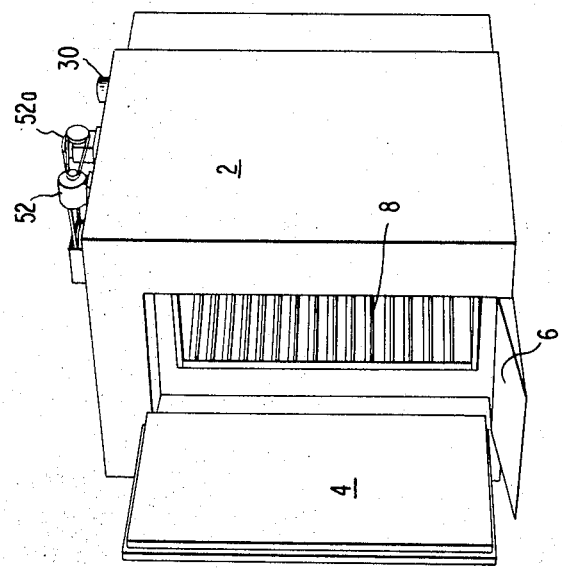
INVENTOR
ALBERT F. VERHOEVEN

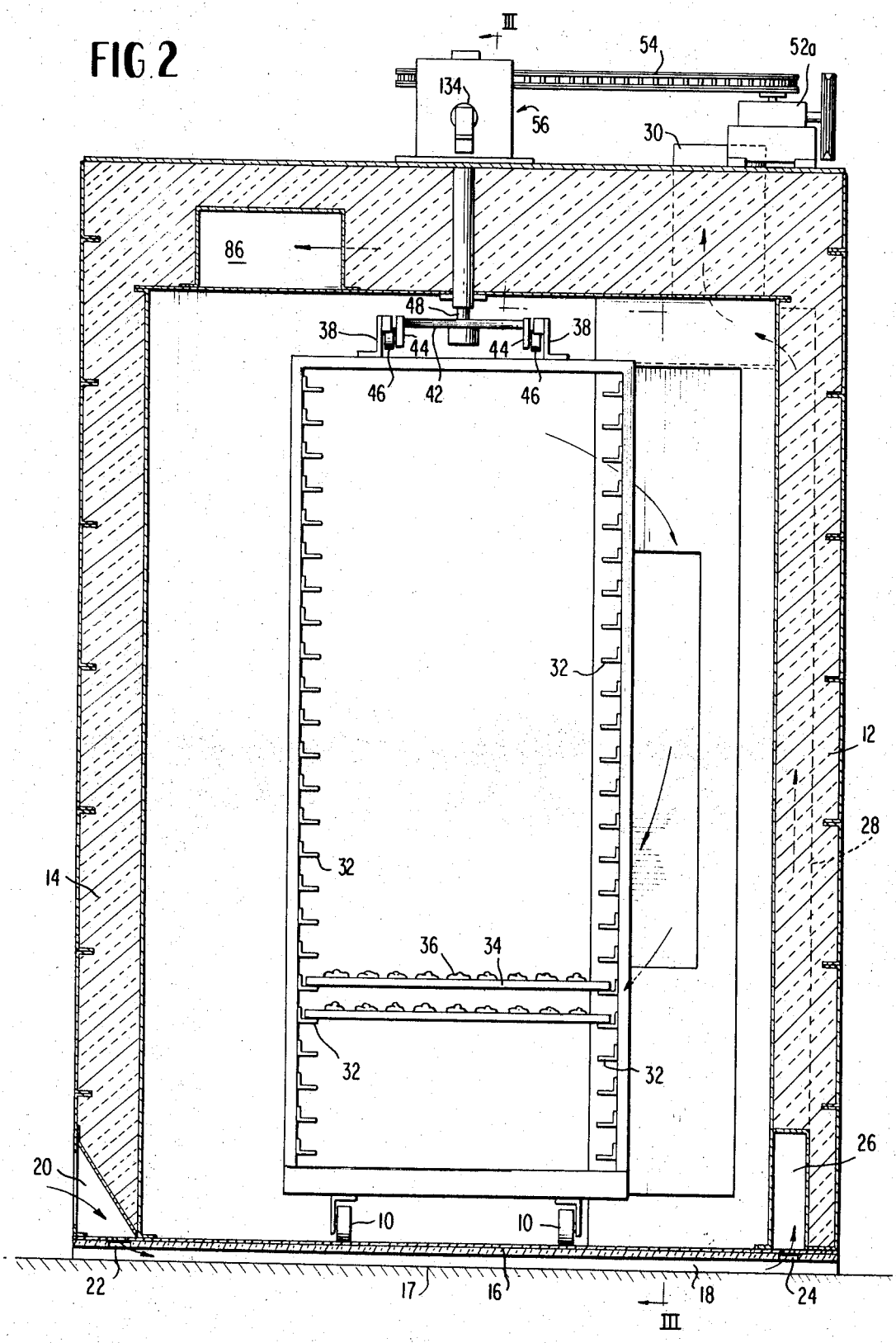

BAKING IN ROTATABLE RACK OVENS

This invention relates to baking a rotatable in rotatable rack ovens. In one of its aspects, it relates to a method of baking goods on a rack which rotates within an oven and heat is supplied from a side of the oven wherein the rack is lifted from its supports and the rack is rotated within the oven during the baking operation.

In another of its aspects the invention relates to a method of baking in an oven in which goods are positioned on a rack within the oven, heat is supplied from one side of the oven and the a rack is rotated within the oven relative to the heat during baking, the method comprising: supplying a heated air column, directing the heated air column in such a manner that the width of the air column as it moves across the goods is substantially less than the diameter of a circle circumscribed by the edges of the rack on which the goods are placed.

In another of its aspects the invention relates to a baking oven having rack engaging means within the oven, lifting means for raising the rack engaging means for rotating the rack engaging means so the rack is rotated within the oven about a substantially vertical axis, and heating means to supply heat to the goods to be baked on the rack from one side of the oven.

In still another of its aspects, the invention relates to a baking oven in which a rack is rotated within the oven, the apparatus comprising a heated air supply means, and a heated air directing means to maintain the flow of heated air across the rotating rack such that the air flow passes only a portion of a circle circumscribed by the rack as it rotates, wherein the width of the portion of the circle is substantially less than the diameter of the circle.

In still another of its aspects, the invention relates to an oven construction wherein there is provided a means for maintaining the floor beneath the oven at a relatively low temperature the maintaining means comprising a horizontal channel beneath the floor of the oven, air inlet means at one side of the channel, and chimney means at the other side of the channel connected to the channel so that air entering the inlet passes beneath the floor of the oven and out the chimney means.

Commercially available baking ovens for smaller baking shops are supplied with racks on which a plurality of trays containing the goods to be baked are placed. The racks are rolled into the oven and the oven is provided with means for rotating the racks within the oven while supplying heat from one side of the oven. Heretofore, the racks having been rotated by rotating the floor on which the racks are placed and/or changing the direction from which heated air is supplied.

While rotating the goods within the oven during the baking operation, it is necessary that the goods not be disturbed or vibrated in any manner. The floor rotating mechanisms are difficult and expensive to make if vibration from the rotational motion is to be eliminated. Further, there are problems in insulating the floor against heat loss due to the relative motion between the floor and the walls of the furnace.

It has also been proposed to rotate the racks within the oven by engaging the top of the rack or bottom of the rack and rotating the rack on its own wheels. However, the contacting of the wheels of the rack with the floor still creates enough vibration and disturbance that the goods are deleteriously affected.

I have now discovered that rotating rack baking can be improved by lifting the rack off the floor and rotating the same while baking.

Baking ovens having rotating racks are readily adaptable to smaller shops. The floors of these smaller shops are generally not equipped for high temperature exposure. For example, concrete or wood floors must be maintained at a temperature below 160°F. to prevent serious damage to them. These smaller ovens generally have to be heavily insulated on the bottom to protect the shop floors.

I have now discovered that the floors beneath the baking oven can be protected by moving an air column between the bottom of the oven and the supporting floor.

Baking in rotating ovens is generally confined to a circular area due to unevenness of baking in the corners of large trays on the racks.

I have now discovered that rectangular or square trays can be employed and substantially all portions of the tray can be used for baking goods with surprising uniformity by supplying the heated air in a column which is confined to a portion of the circle circumscribed by the edges of the rotating rack. The portion of the circle occupied by the heated air is substantially less than the diameter of the circle.

By various aspects of this invention one or more of the following, or other, objects can be obtained.

It is an object of this invention to provide an improved rotating rack baking oven.

It is a further object of this invention to provide a baking oven wherein goods are rotated within the oven and the disturbance of the goods during the rotation is minimized.

It is a further object of this invention to provide an improved method and apparatus for baking wherein the floor beneath the oven is protected from heat damage.

It is yet another object of this invention to provide a method and apparatus for baking wherein the goods are rotated within the oven on a rack which stops in the same position as it starts to facilitate loading and unloading of the oven.

It is still another object of this invention to provide a rotational baking process and apparatus wherein uniformity of baking rates on all portions of rectangular baking pans is maintained.

Other aspects, objects, and the several advantages of this invention are apparent to one skilled in the art from a study of this disclosure, the drawings, and the appended claims.

According to the invention, there is provided a baking oven in which racks containing goods to be baked are moved into the oven. The racks are lifted and supported by the lifting mechanism, and then rotated within the oven while heated air is supplied in a column from one side of the furnace. The heated air column has a width substantially less than the diameter of the circle circumscribed by the edges of the rotating pan. Generally, the width of the heated air column can be 20 percent to about 75 percent of the diameter of the circle circumscribed by the edges or corners of the rotating rack. Preferably, the width of the air column will be 20 to 50 percent of the diameter of the circle. The heated column can be wedged shaped or pie shaped or any suitable shape to provide uniform baking of the goods on the rotating rack.

Means are provided to introduce a column of air beneath the floor of the oven to protect the floor on which the oven is placed.

The invention will now be described with reference to the accompanying drawings in which:

FIG. 1 shows a perspective view of an oven embodying the invention;

FIG. 2 is a front elevational view, in section, of the oven shown in FIG. 1;

FIG. 3 is a side sectional plan view taken along lines III–III of FIG. 2;

Figure 4:
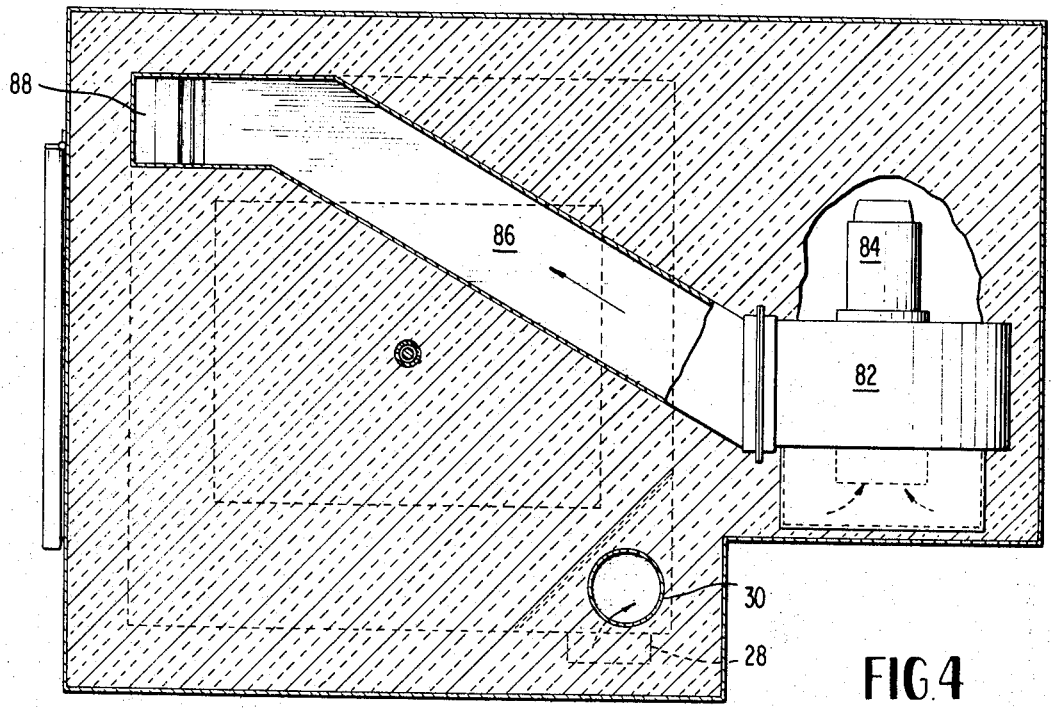
FIG. 4 is a sectional plan view taken along lines IV–IV of FIG. 3.

Referring now to FIGS. 1 through 5 in particular, an oven generally designated as 2 has a swingable door 4 which opens into an oven chamber. A rack 8 having wheels 10 can be positioned within the oven chamber by rolling the rack up ramp 6 into the furnace chamber. The oven contains side walls 12 and 14, a floor 16, and floor supports 18. The floor supports 18 run laterally across the bottom of the furnace. The floor 16 comprises a supporting surface and relatively thin insulating material beneath the surface, leaving a plurality of lateral channels between the insulating material of the floor 16 and the supporting floor 17 on which the oven rests. Side wall 14 has a cut away portion 20 and a plurality of holes 22, each opening into one of the laterally extending channels formed by floor 16, floor supports 18, and the supporting floor 17. At the other end of the channels, a hole 24 connects the channels with conduit 26 which, in turn, is connected to a vertical chimney 28. The chimney 28 has an opening at the top portion thereof into space 70 which is connected with exhaust outlet 30. When the oven floor 16 becomes hot, heated air beneath the floor passes out through hole 24, conduit 26, chimney 28, and an exhaust outlet 30. This natural chimney draws in cooler air through the cut away portion 20 and hole 22. In this manner a continuous air column is provided by connection beneath the floor 16 of the oven to maintain the temperature of the supporting floor low enough to be free from heat damage. It has been found that the apparatus can maintain the supporting floor beneath the furnace below 160°F. even though the temperature inside the oven is 400°F. or higher.

The cooling structure provides an inexpensive manner of preventing heat damage to the floor. It is appreciated that the oven floor can be constructed with thin insulating material to thereby reduce the cost of the structure.

The racks 8 contain a plurality of angle bars 32 which support a plurality of trays 34. Products 26 to be baked are positioned on all portions of the rectangular or square trays 34. At the top portion of the rack, a pair of L-shaped support bars 38 are attached to rails 40. The rack is engaged by a structure comprising roller support 42, depending flanges 44, and rollers 46. The rollers 46 contact the roll beneath rails 40 and are positioned in indentation 50 which restrain the movement of the racks with respect to the rack engaging structure. The roller support 42 is fixed to shaft 48 which is axially reciprocatable and rotates about the longitudinal axis.

A motor 52 drives the racks through a speed reducer 52a and a chain belt 54.

The racks are rolled into the oven on rollers 10 which contact the floor 16 of the oven, As the rack enters the oven, the rails 40 are guided by rollers 46 until the rollers are positioned in indentations 50. The rack is then properly positioned within the oven. The door 4 is closed and the operation is started. The raising and rotating mechanism 56 lifts rotatable shaft 48 and causes the shift 48 to begin rotating with the rack being supported by the rotating shaft 48. IN In this manner, a smooth s rotating operation is carried out during the baking operation.

During the baking operation, heat is supplied through a vertically extending hot air register 58. The hot air register 58 has vertically adjustable vanes 60 to direct the flow of air in a column across the goods being baked. The heated air flows down hot air supply duct 88 and it is caught by horizontal adjustment vanes 66 and uniformly disbursed into space 62 by air directing vanes 64.

A return air register 68 is positioned opposite hot air register 58 in the oven. The return air flows through register 68 into space 70, return air duct 72, and around casing 76. A portion of the return air can pass upwardly in space 70, out exhaust outlet 30. A combustion chamber 74 has a flame supplied by a conventional burner (not shown). Air is drawn in around the burner and into the combustion chamber. The heated gaseous mixture is mingled with the return air at the side wall 14 end of the combustion chamber and passes upwardly into contact with the evaporating trays 78. Water is continuously supplied to the evaporating trays 78 and this water is picked up in the form of steam by the circulating air. The air containing moisture then passes up through duct 80 and is driven by fan 82 into duct 86 and downwardly into hot air supply duct 88. The fan is driven by a motor 84. Alternately, means can be provided to drive fans 82 through motor 52.

Figure 5:
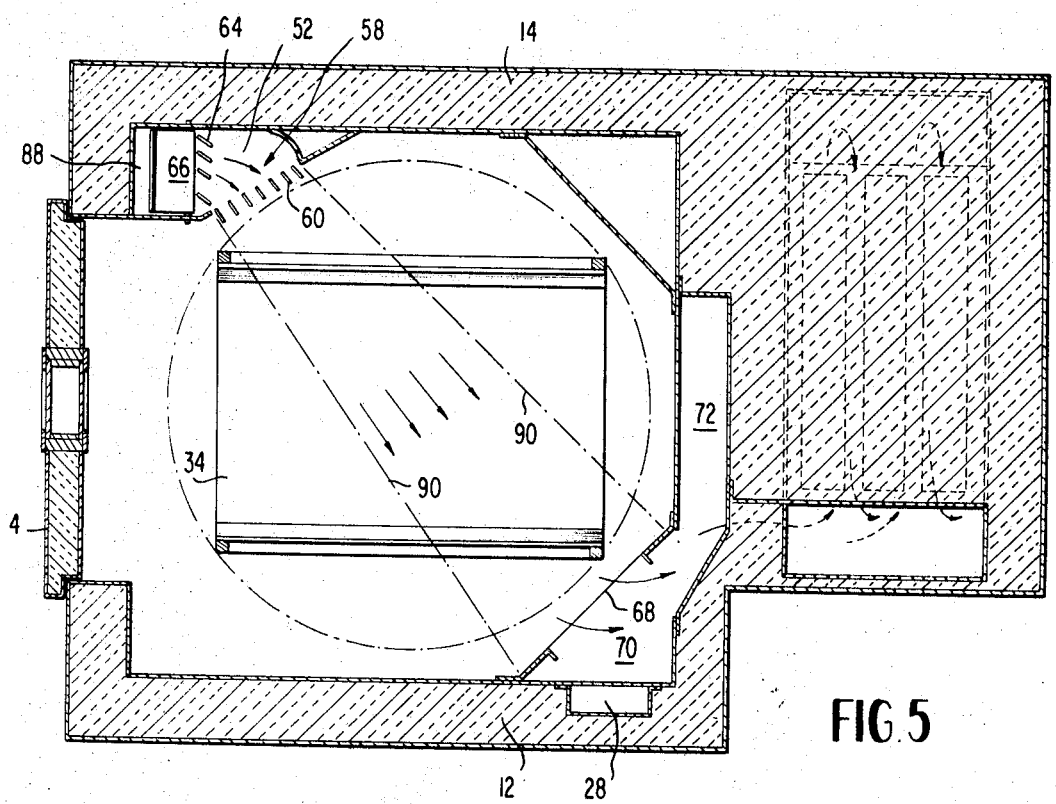
FIG. 5 is a sectional plan view taken along lines V–V of FIG. 3.

The vertical adjustable vanes 60 direct the heated air or gases in a column across the baked goods. As can be seen in FIG. 5, the flow of heated air is represented by the area between lines 90. Most of the baking will take place between the central portion of the trays 34 and the hot air register 58. As can be seen from the drawing, the width of the heated air column is substantially less than the diameter of the circle circumscribed by the edges of trays 34 as it rotates about the central axis. As will be appreciated by those skilled in the art, the goods 36 on the corners of the trays 34 will be subjected to more intense heat than those goods 36 near the center of the tray 34. However, the goods at the outer portion of the tray are moving at a higher velocity and therefore will be subjected to the heated air stream for less of a time than those in the central portion. Thus, the rotational speed of the rack, and the width of the heated air stream can be adjusted to provide a uniform baking condition on all portions of the tray. The velocity of the heated air stream, the rotational velocity of the rack, and the width of the heated air stream will vary depending upon the goods to be baked on the racks.

Generally, the width of the heated air stream will be in the range of 20 to 75 percent of the diameter of the circle circumscribed by the tray corners as it rotates, preferably in the range of 25 40 percent of the diameter of said circle. The vanes 60 can be adjusted so that the heated air stream is directed into a point in the center of the tray or so that the air stream is wedge shaped.

The raising and rotating mechanism 56 is shown in detail in FIGS. 6 through 10. Referring now specifically to FIGS. 6 through 10, it will be seen the mechanism is located within a housing comprising the bottom wall 56a, side walls 56b, and top wall 56c. A rotatable shaft 48 extends through the housing and rotates within bushings 94a, 94b, and 95. Surrounding the rotatable shaft 48 at oven top 92 is bearing 96 which supports lower collar 98. The lower collar 98 is keyed to and rotatable with rotatable shaft 48 by virtue of a spline 106 which engages a groove 100 in the rotatable shaft 48. However, by this means the shaft 48 is slidable vertically within the lower collar 98. The sprocket 136 is also keyed to rotatable shaft 48 which is vertically reciprocatable therewith. Power is supplied to the rotatable shaft 48 through the sprocket 136 which engages chain 54 (FIG. 2).

The lower collar 98 has a roller 104 which is suitably journalled in an outer portion of the lower collar 98. The roller 104 contacts the cam surface 114 on one end of lifter plate 108 which is supported at the other end by pin 110, positioned in support 112. The lifter plate 108 has a central aperture 109 into which lower collar 98 and upper collar 118 extend and are free to move without interference. The lifter plate 108 contains a nose 116, for a purpose which will be hereinafter described, and a pair of rollers 121 suitably journalled in the side thereof through axles 122. The lower collar 98 has an annular cutout portion at 124 to permit the rollers to roll freely above lower collar 98. The upper collar 118 is pinned to shaft 48 through pin 120. The rollers 121 bear against the bearing surface 126 cut from the upper collar 118.

Figure 10:
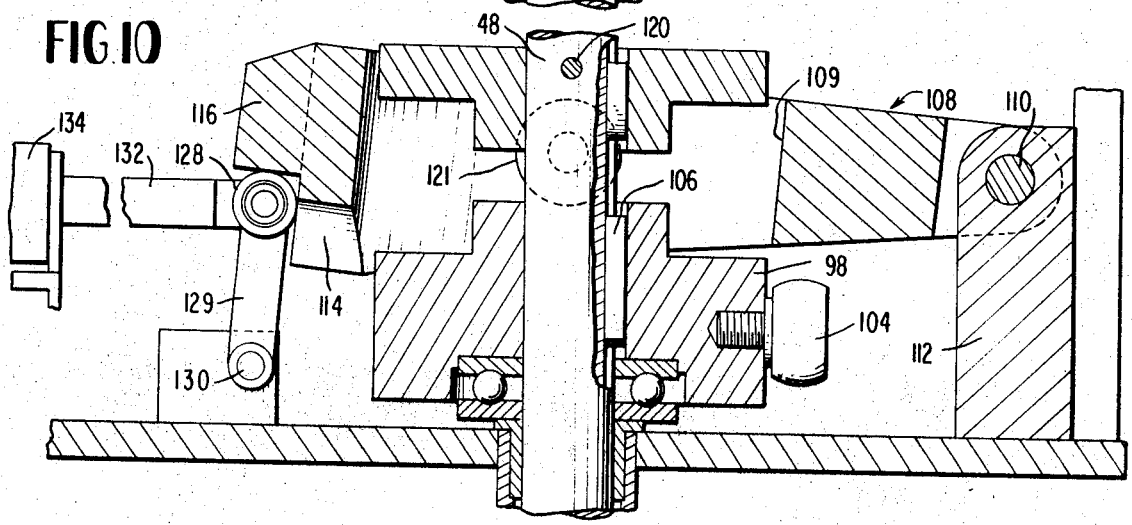
FIG. 10 is a sectional view similar to FIG. 8, showing the raised position of the rotatable shaft.

A roller 128 is positioned beneath nose 116 of lifter plate 108 when the lifter plate is in the up position (FIG. 10). The roller 128 is rotatable about pin 130 through linkage 129 and is operated through a linkage 130 which is connected to an electrical solenoid 134.

Figure 7:
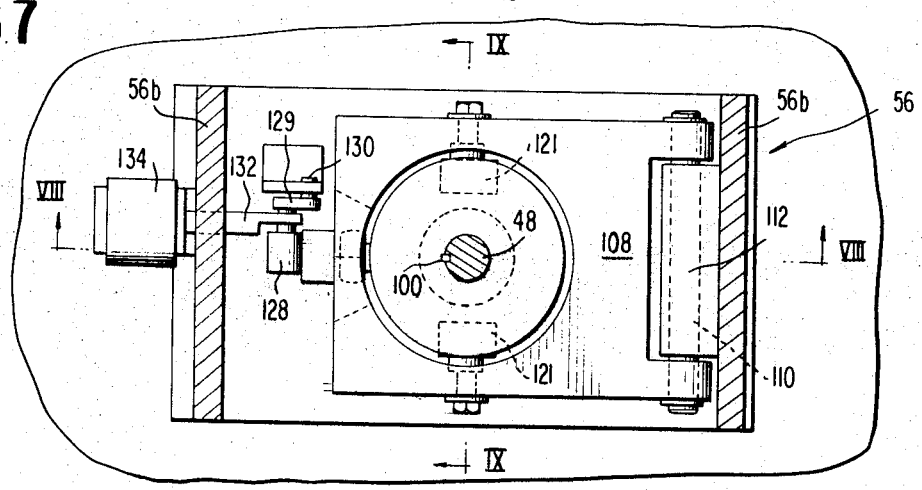
FIG. 7 is a sectional view taken along lines VII–VII of FIG. 6.

In operation, after the rack has been properly positioned on the rack engaging means, and the motor is actuated, shaft 48 begins to rotate, for example, in a clockwise direction as seen from FIG. 7. Roller 104 bearing against cam surface 114 causes lifter plate 108 to be raised. The raising of lifter plate 108 raises upper collar 118 through rollers 121 thereby raising rotatable shaft 48. At this point, the solenoid 134 will be actuated to cause roller 128 to be positioned beneath nose 116 of lifter plate 108. When this roller 128 is so positioned, the rotatable shaft 48 will remain in the raised position and the rack will thereby be lifted off the oven floor and rotated.

It will be appreciated that this smooth operation minimizes any vibrational effects of the mechanism which rotates the rack 8.

Figure 6:
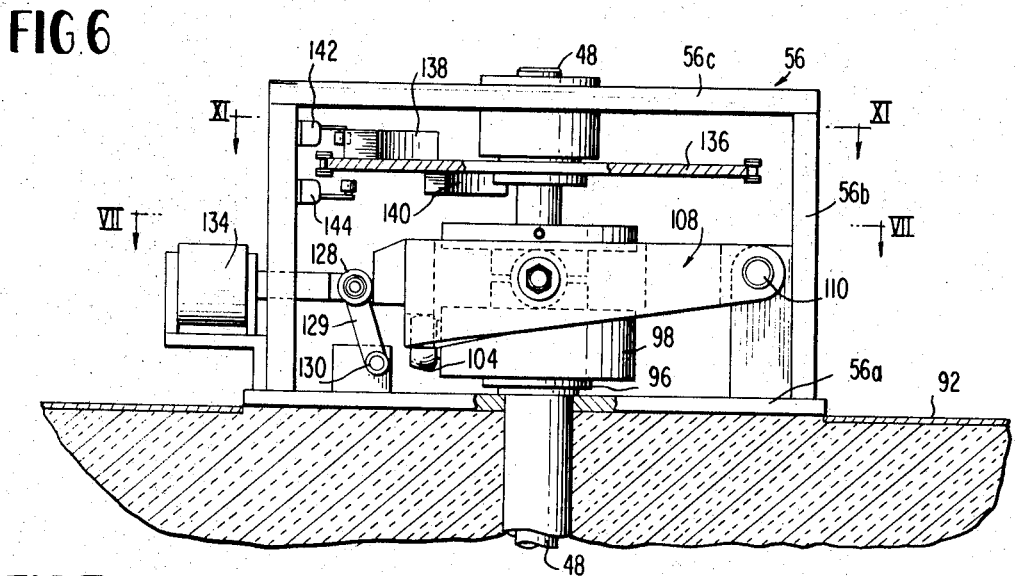
FIG. 6 is a side elevational view of the lifting mechanism shown in FIGS. 2 and 3.
Figure 11:
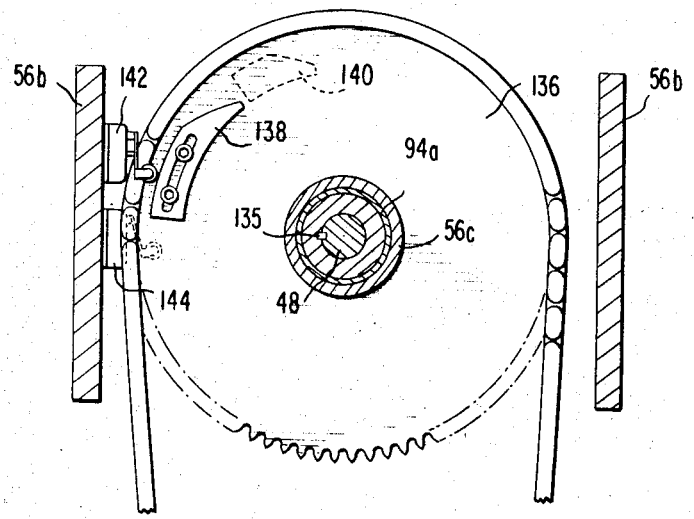
FIG. 11 is a plan view of the rack positioning mechanism taken along lines XI–XI of FIG. 6.
Figure 8:
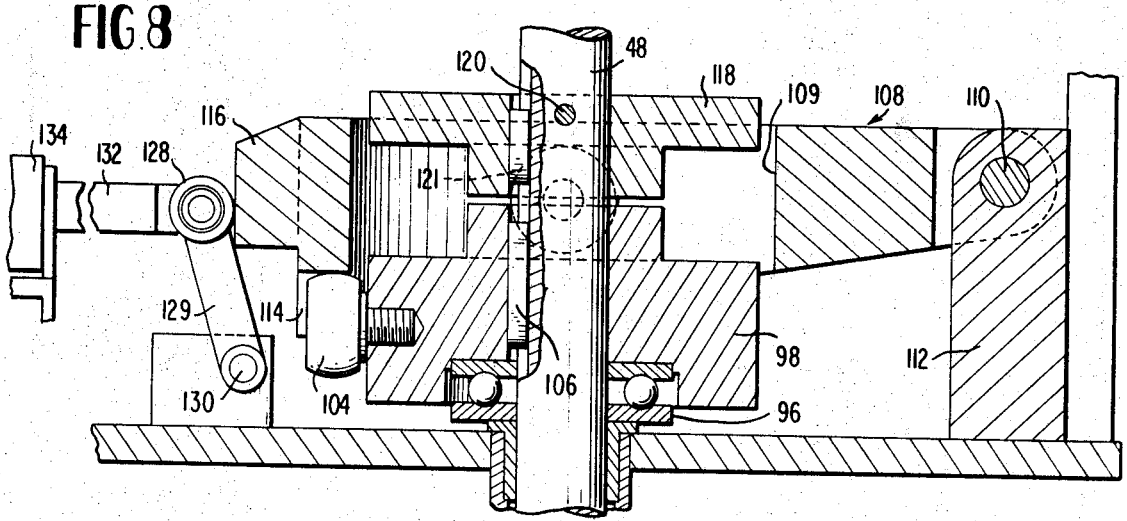
FIG. 8 is a sectional view taken along lines VIII–VIII of FIG. 7.

Referring now to FIGS. 6 and 11, a sprocket wheel 136 has a switch actuating cam 138 on the top surface thereof and a switch actuating cam 140 on the bottom surface thereof. The sprocket wheel 136 is keyed to shaft 48 through spline 135. As the sprocket wheel 136 rotates, switch actuating cam 138 contacts a cam follower on switch 142 to actuate the opening and closing of that switch. Also, switch actuating cam 140 contacts a cam follower on switch 144 to actuate the opening and closing of that switch.

Figure 12:
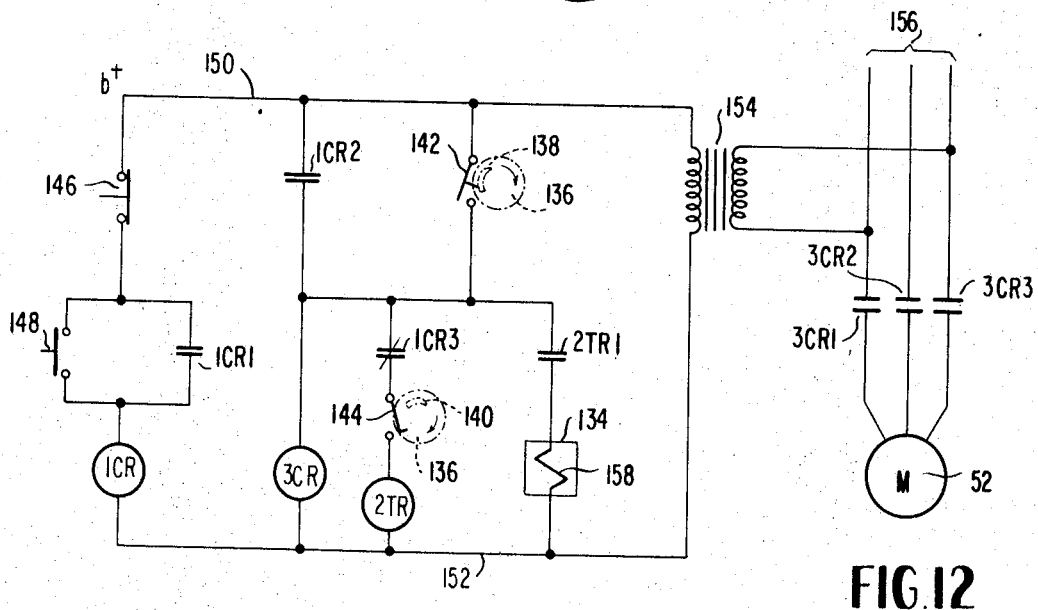
FIG. 12 is a schematic diagram of an electrical system which can be employed in the invention.
Figure 9:
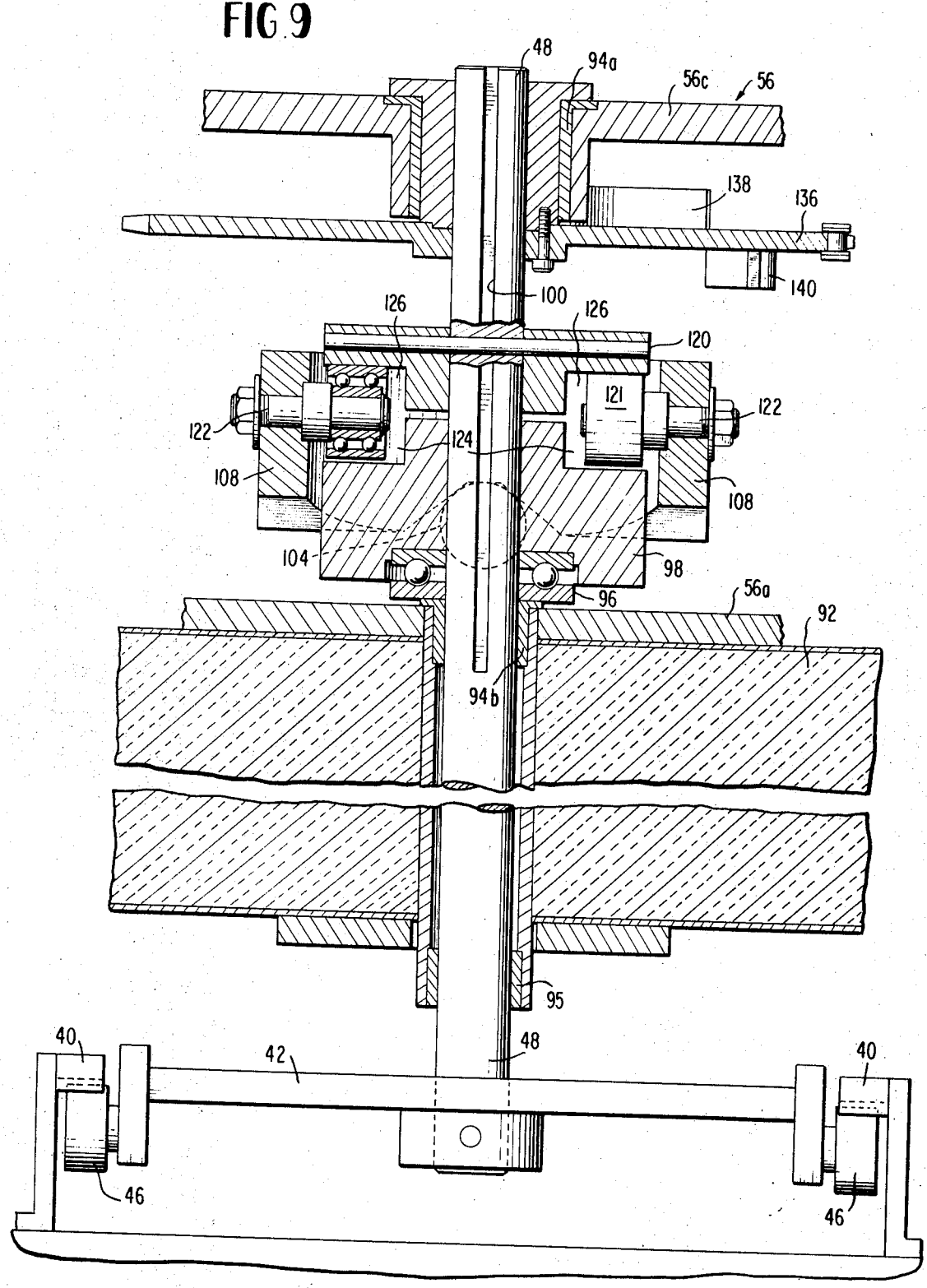
FIG. 9 is a sectional view taken along line IX–IX of FIG. 7.

Referring now to FIG. 12, there is shown an electrical system which can be used to operate the rotation of the rack so that the rack will stop at the same predetermined position at which it starts. A power source 156 is connected to motor 52 through relay contacts 3CR1, 3CR2, and 3CR3. The motor is connected through a pulley 52a and gear reducer 52b to the sprocket wheel 136 which drives the rack through rotatable shaft 48.

The control circuit has power supplied from power source 156 through a direct current transformer 154. Between common 152 and a b+ line 150, there is connected a normally closed stop button switch 146 in series with a push button holding circuit comprising a relay coil 1CR and a parallel circuit containing normally open start button switch 148 and relay contacts 1CR1.

The b+ line 150 is also connected to a parallel circuit comprising relay contacts 1CR2, and normally closed switch 142. The parallel circuit of switch 142 and relay contact 1CR2 connected to the common line 152 through a parallel circuit comprising relay coil 3CR at one leg thereof; a second leg of a normally closed relay contacts 1CR3, normally open switch 144, and relay coil 2TR; and a third leg of open time relay contact 2TR1 and solenoid coil 158. Solenoid coil 158 actuates solenoid 134 to retract linkage 132 when the coil is energized. The linkage 132 is spring biased outwardly so that when the coil is not energized, the linkage will be urged outwardly against nose 116.

In operation, when the rack is pushed into the oven, the sprocket wheel 136 will be in the position shown in FIGS. 6 and 11. In this position, switch actuating cam 138 is pushing in on the cam follower of normally closed switch 142 to hold that switch open. Normally open switch 144 is not contacted by cam 140 and therefore it is also open. Therefore, all the circuits of FIG. 12 are open. When the start button switch 148 is closed, the current will flow through relay coil 1CR to close relay contacts 1CR1, 1CR2, and to open relay contact 1CR3. The current can then flow from b+ line 150 through contact relay 1CR2 and through contact relay coil 3CR to common 152. This causes the current through relay coil 3CR to close relay contacts 3CR1, 3CR2, and 3CR3. This closing of these relay contacts will allow the current to flow to motor 152. At this point, the motor starts to rotate the rack.

As the rack rotates, sprocket wheel 136 will rotate so as to move switch actuating cam 138 out of contact with the cam follower of switch 142. At this point, normally closed switch 142 will close. As the sprocket wheel 136 rotates, it causes roller 104 to push against cam surface 114 to raise lifter plate 108 and permit positioning of roller 128 beneath nose 116. In this manner, the rack will be lifted off the oven floor by the raising of shaft 48. The rack will continue to rotate off the oven floor until stop button 146 is pushed.

When the baking time has expired as determined by the operator, he pushes stop button 146. This opens the circuit of relay coil 1CR, which in turn opens relay contacts 1CR1 and 1CR2, and closes relay contacts 1CR3. Assuming that switch actuating cam 138 is not contacting the cam follower of switch 142, the switch 142 will be closed, thereby permitting current to flow from b+ line 150 through contact relay coil 3CR to maintain relay contacts 3CR1, 3CR2, and 3CR3 closed and continuing the operation of motor 52 for at least a portion of one rotation of rack 8.

As switch actuating cam 140 contacts the cam follower of switch 144, it is closed to permit the current to flow through time relay coil 2TR. This flow of current through relay coil TR2 closes time relay 2TR1 causing current to flow through solenoid coil 150 to energize the same and retract linkage 132 so as to pull roller 128 out from under the nose 116. Since 2TR is a time relay, the relay contact 2TR1 remains closed for a short period of time. During this time period the rack will rotate until switch actuating cam 138 contacts the cam follower of switch 142 to open that switch. When switch 142 opens, the current cannot flow through relay coil 3CR and thus, relay contacts 3CR1, 3CR2, and 3CR3 are opened and the motor stops. At this point the roller 104 will gently lower shaft 48 as the motor stops. The switch actuating cam 138 is adjustable and somewhat longer than switch actuating cam 140 to permit the motor to stop while maintaining switch 142 closed.

Thus, it can be seen that the invention provides a means for positioning the rack in a same position as it is pushed into the furnace so that it can be easily removed.

The above described electrical system has been described as an example of a system which can be used according to the invention. Other systems will be suggested to one skilled in the art.

Whereas the invention has been described with a particular embodiment, it is obvious that other mechanical means and electrical means can be employed within the scope of the invention. For example, other means can be employed to engage the rack and other means can be employed to lift and rotate the rack within the oven. It is important, however, in a preferred embodiment of the invention, to lift the rack from its wheel supports above the oven in order to minimize vibration.

I claim:

1. A method of baking goods on a plurality of vertically spaced trays supported by a rack within an oven in which the rack containing the trays is positioned within the oven and heated air is supplied in a vertical column from a side of the oven, said method comprising loading said rack exteriorly of said oven, positioning a said loaded rack within said oven, lifting said rack from its supports, rotating said rack within said oven about a vertical axis while said heated air is directed across said goods from one side of said oven, and removing said rack from said oven after said goods are baked.

2. A method of baking according to claim 1 wherein said vertical column has a width substantially less than the diameter of a circle circumscribed by the edges of said rack, and the speed of rotation of said rack within said oven is adjusted to provide a uniform baking condition across said rack.

3. A method of baking according to claim 2 wherein said heated air column has a width in the range of 20 to 75 percent of the diameter of said circle.

4. In a method of baking in which goods are positioned on a rack which is movable into and out of an oven, the rack is loaded with said goods exteriorly of said oven, heated air is supplied to the rack from one side of the oven, and a rack is rotated within the furnace relative to the heat during the baking, the improvement which comprises: introducing a vertical heated air column into the oven to pass generally across the goods on said rotating rack; and directing said heated air column in such a manner that the width of said air column as it moves across said goods is substantially less than the diameter of a circle circumscribed by the edges of said rack, whereby the goods on all portions of said tray are baked evenly.

5. A method of baking according to claim 4 wherein said width of said air column is in the range of 25 to 40 percent of the diameter of said circle.

6. A baking apparatus comprising: a rack for vertically supporting a plurality of trays of baking goods; a baking oven; said rack being separable from said oven for loading exteriorly of said oven and said rack being positionable within said oven for baking goods positioned thereon; rack engaging means within said oven; lifting means for raising said rack engaged by said engaging means; means for rotating said rack engaging means so that said rack is rotated within said furnace about a substantially vertical axis; and heating means for supplying heat to goods on said rack.

7. An apparatus according to claim 6 wherein said heating means comprises: heated air supply means, means to direct said heated air in a vertical column form one side of said oven over only a portion of the diameter of a circle circumscribed by the edges of said rotating rack.

8. An apparatus according to claim 6 wherein adjustable vanes are provided to vary the width of said air stream relative to said rotating rack.

9. A baking apparatus according to claim 6 wherein said lifting means comprises means to lift said engaging means as said engaging means begins rotating.

10. A baking apparatus according to claim 9 wherein means are provided to return said engaging means to the same rotational position when said baking cycle is completed.

11. A baking apparatus according to claim 6 wherein said lifting means comprises: a rotatable shaft; a lower collar keyed to said shaft; said shaft being reciprocatable axially relative to said lower collar; cam follower means on said lower collar; lifting plate means having a cam surface contacting said lower collar roller, such that said lifting plate means is raised or lowered as said lower collar rotates; upper collar means fixed to said rotatable shaft; bearing means between said lifting plate means and said upper collar means whereby said upper collar is raised and lowered as said lifting plate means is raised and lowered.

12. A baking apparatus according to claim 11 wherein means are provided to maintain a said lifting plate means in the raised position after said lifting plate means has been raised.

13. A baking apparatus according to claim 12 wherein release means for said lifting plate maintaining means are provided to release said lifting plate means as said rotatable shaft approaches a predetermined position; power means are provided to rotate said rotatable shaft; means are provided to actuate said release means first and then to stop said power means as said rotatable shaft approaches a said predetermined position.

14. A baking apparatus according to claim 6 wherein means are provided to supply a moving column of air beneath the floor of said oven to maintain a supporting floor beneath said oven relatively cool.

15. A baking apparatus comprising: a baking chamber; means to supply heated air in a vertical column from one side of said baking chamber; means to support goods within said baking chamber; means to rotate said support means within said baking chamber; hot air directing means to maintain the flow of heated air in a vertical column across said goods such that the air flow passes across only a portion of a circle circumscribed by the corners of said goods supporting means.

16. An apparatus according to claim 15 wherein said portion comprises a width of 20 to 75 percent of the diameter of said circle.

17 A baking apparatus comprising: a baking oven having a floor; a rack having means for conveying the same over said floor into said oven; rack supporting means having a first part attached to a top portion of said rack and a second part supported at the top portion of said oven; said parts being separable one from the other; said rack supporting means including lifting means for causing said rack to be lifted such that said means for conveying is lifted off and spaced above floor; means for rotating said rack supporting means so that said rack is rotated within said furnace about a substantially vertical axis; and means for supplying heat to said oven for baking goods on said rack.